United States Patent Office 3,002,272
Patented Oct. 3, 1961

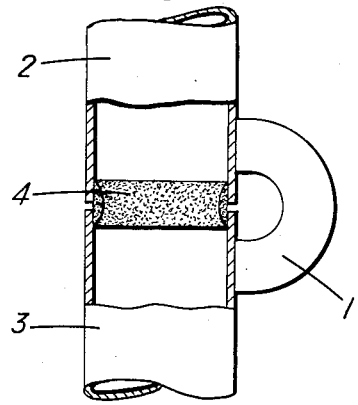
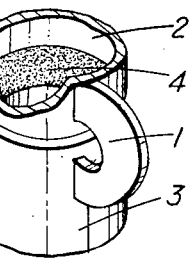
Fig. 1.
Fig. 2.
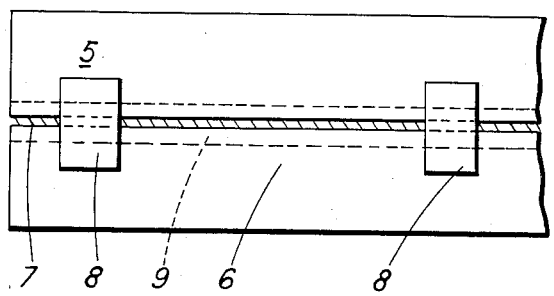
Fig. 3.
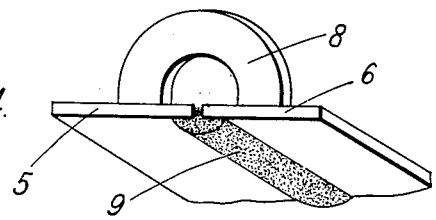
Fig. 4.

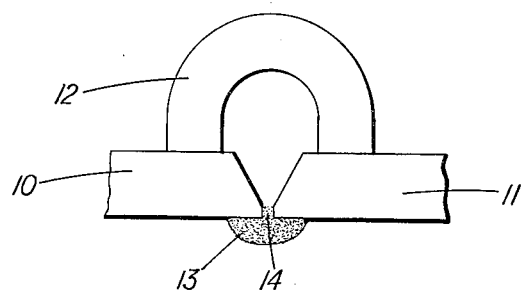
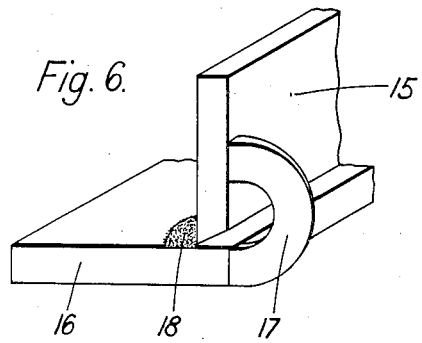
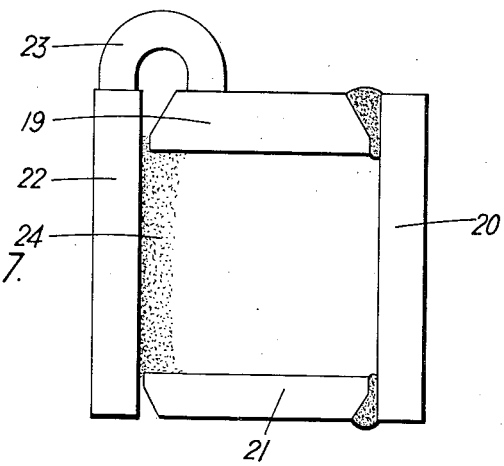

3,002,272
WELDING BY FUSION-DEPOSITION
Lewis Abraham Hodges, Sheffield, England, assignor to The Birmingham Small Arms Company Limited, Birmingham, England, a British company
Filed Nov. 21, 1956, Ser. No. 623,696
Claims priority, application Great Britain Dec. 7, 1955
7 Claims. (Cl. 29—491)

This invention relates to welding by fusion-deposition of weld metal between the edges of the metal parts to be joined.

It is most important for the metal of a butt weld formed in this way to extend homogeneously throughout the thickness of the parts to be joined, in order to secure maximum strength at the joint, and indeed it is preferable for the surface of the weld to be a slight convex protuberance at both faces, which ensures that the weld is at least as thick as the parts joined by it. To ensure this, and to produce a weld free from undercuts, surface porosity, or other irregularity, it is usual for the weld to be effected from both sides, a main run (or series of main runs) being first applied from one side, the underface of this run then being chipped, and a sealing run (or series of sealing runs) finally being applied from the other (chipped) side. However, it is sometimes impossible, and often inconvenient, to obtain access to the underface for chipping and final welding, as in the case of double-walled vessels and vessels of so small a size that work cannot easily be performed inside them, even if an operator can enter at all.

Attempts to weld from one side only lead to various disadvantages. It is rarely possible to produce a uniform fit between the edges of the parts, and even slight irregularities in the fit tend to produce large variations in the finish of the underface. Insufficient penetration to the other face at a tight fit may leave a crack-like trace along the joint, which could be the seat of possible corrosion troubles, and fatigue or other failure. At an open fit, the weld may penetrate beyond the face and leave projecting spheroids of badly oxidised metal. In extreme cases, the energy of the welding arc may blast a hole completely through the abutting edges, which damage is extremely difficult, if not impossible, to re-fill satisfactorily.

The inaccessibility of the other face may likewise make it impossible to apply (and subsequently remove) a rigid backing against which the weld metal may be run, even in the case where such a backing could be accurately moulded and fitted to the parts, and such an expedient, if practicable, is tedious and costly.

Again, the welding of very thin sheet material is difficult, because of the ease of burning through, yet the thinness of the sheets and their readiness to buckle makes it difficult to maintain the necessary good contact between them and a rigid backing applied to the underface, even if the underface is accessible.

According to the present invention, a method of welding two ferro-magnetic parts consists in securing the parts with adjoining edges in correct position to receive a fusion-deposit of weld metal frontwardly, applying a magnetic field between the adjoining edges, applying to the rear of the parts a powder that is ferro-magnetic as to at least 50% of its composition, so as to form a continuous bridge, and effecting welding with the bridge of powder providing a support at the rear of the parts for the molten weld metal.

A permanent magnet or an electro-magnet may be used to produce the magnetic field, and as many magnets may be used as necessary to produce a continuous length of supporting bridge over the length of weld to be completed at one pass; but, as indicated below, there are circumstances where a single magnet suffices. Where two or more magnets are used, they are spaced close enough to ensure a strong bridge of powder over the length determined by that spacing, and by appropriately close spacing, such a bridge may be maintained as any magnet is removed to permit welding to continue over the part of the length previously occupied by it as may be desirable for uninterrupted welding, e.g. by machine.

With magnets readily applicable to the accessible outer face, the magnetic powder may be applied in suitable quantity to the other face, even where access is difficult, e.g. by the use of a non-magnetic tube, the mouth of which may be drawn in proximity to the line of weld. When the magnets are removed after the powder bridge has permitted a sound run of metal to be applied, the powder is detached from the parts, which are either demagnetised by the heat of welding or may be heated for this purpose, and the powder may then be recovered. In the frequent cases where more than one run is necessary, removal of the magnets after the first run allows the heat of the subsequent welding to effect the desired demagnetising of the parts.

The invention is applicable to both electric welding and to gas welding, and to vertical and inclined welds, as well as to horizontal welds.

The mechanical support of the magnetic bridge, tending to reestablish itself if the energy of the welding arc should by chance disturb it, is remarkably good, and it may be very regular along the line of weld, so that the underface of the weld has a good regular appearance. But, since the bridge is not completely rigid, the underface of the weld tends to protrude somewhat, thus ensuring that the finished weld is at least as thick as the edges of the parts. Any incorporation of the powder in the weld tends to be confined to this protuberance.

However, in many cases, such incorporation may be of little consequence. Thus, if iron powder is used in the welding of mild steel or low alloy steel, the diluting effect of the iron powder on a first run may be very slight. If even this is undesirable, the powder used may be of an alloy corresponding to that of the necessarily magnetic parts to be welded, either pre-alloyed or formed by a mixture in the required proportions of separate powders of the alloy ingredients.

Again, magnetic ceramic powder may be used, and the refractory character of this discourages diffusion of its constituents into the weld.

Mixtures of various powders may be used, provided that at least 50% of the whole is ferro-magnetic, for the purpose of enabling the total powder to be held as a supporting bridge. Thus, non-magnetic metal or alloy, or refractory material, may be included. Again, it may be advantageous to include a flux in powder form, this promoting a smoother and cleaner underface to the weld.

The convenience in the welding of longitudinal, circumferential and other seams of vessels not readily accessible as to the underfaces of the welds will be apparent. It may, however, even be advantageous to use the magnetic bridge for the avoidance of chipping and internal welding in cases where accessibility is reasonably good.

Accompanying drawings illustrate ways of carrying the invention into effect. In the drawings—

FIGURE 1 is a fragmentary side view partly in medial section, of a pair of tubes to be welded together endwise, FIGURE 2 is a top perspective view thereof, FIGURE 3 is a fragmentary plan view of a pair of plates to be welded together edgewise, FIGURE 4 is an underneath perspective view thereof, FIGURE 5 is a fragmentary end view of a pair of plates to be welded together edgewise.

FIGURE 6 is a fragmentary perspective view of a pair of plates to be welded together cornerwise, and FIGURE 7 is a fragmentary end view of four plates for forming into box section by welding.

One application of the invention illustrated in FIGURES 1 and 2, is in the circumferential welding of pipes of a diameter so small as to preclude all reasonable access to the inside of the weld. In such cases, a single permanent magnet 1 bridging a portion of the ends of two pipes 2, 3 respectively suffices to form a complete circumferential bridge 4 of magnetic powder applied inside the pipes 2, 3.

Another application is in the joining together of two plates in an edgewise manner, illustrated in FIGURES 3 and 4. Plates 5, 6 respectively are positioned with a gap 7 between their edges. Magnets 8 are placed across the gap and are suitably spaced from one another. Magnetic powder is applied to the reverse side of the plates in the neighbourhood of the gap 7 and forms a bridge 9 having a convex outer surface, there being a tendency for some of the powder to find its way into the gap 7 from whence it can be cleared prior to welding. The powder bridge 9 forms a mechanical support for molten weld metal introduced into the gap 7 as the plates 5, 6 are welded. In a specific example, two mild steel plates each 1/8" in thickness were positioned side-by-side so that their adjacent edges were 1/16" apart. A plurality of magnets were placed so as to bridge the two plates, each magnet being of Alcomax II and possessing a total flux of 12,500 lines. The magnets were spaced at 6" intervals. Commercial iron powder was applied to the underside of the plates in the vicinity of the gap therebetween, and welding in a downward direction was effected using a 10 S.W.G. type E. 217 electrode with A.C. at 100 volts open circuit and a welding current of 125 amps. A uniform weld having a slightly convex underside resulted. When the weld was repeated under the same conditions but without magnets and iron powder, bad burning of the plates and a non-uniform and pitted weld underside resulted.

Where relatively thick plates are to be joined edgewise, it is common practice to bevel the edges of the plates to be joined and to fill the V-groove thus formed with the welding metal. The invention may be applied to this manner of welding as illustrated in FIGURE 5, wherein two relatively thick plates 10, 11 respectively have their edges to be joined bevelled except for a small portion adjacent the undersides. One or more magnets 12 and magnetic powder are used to form a bridge 13 on the underside of the adjoining edges, a small gap 14 being left between the adjoining square-ended portions from which powder is cleared. In a specific example, two 3/4" thick mild steel plates had their edges to be welded bevelled at 45° except for an 1/8" root face left square. The plates were positioned with the root faces 1/8" apart and magnets similar to those referred to in the example hereinbefore described were spaced 6" apart. Commercial iron powder was applied to the underside of the plates in the vicinity of the adjoining edges, and welding was effected with an 8 S.W.G. type E. 217 electrode using A.C. 100 volts open circuit and a welding current of 160 amps. A uniform weld having a slightly convex underside resulted.

The welding of relatively thick plates together cornerwise is another application of the invention and is illustrated in FIGURE 6. A plate 15 to be joined in vertical relationship to a horizontally disposed plate 16 has its adjoining edge bevelled so as to form a V-groove between that edge and the adjoining edge portion of the plate 16. One or more magnets 17 and magnetic powder applied behind the plate 15 are employed to form a powder backing 18, a small gap being left between the two plates, and welding is effected. If desired or if found expedient, the edge portion of the horizontal plate 16 can also be bevelled, and a square root edge may be left on the edge of the plate 15. In a specific example, 1/2" mild steel plates to be joined cornerwise were arranged at right angles to one another and having the edge of one plate and the adjoining edge portion of the other plate bevelled to form a V-groove. A plurality of Alcomax II magnets each having a total flux of 34,500 lines were spaced 12" apart. Welding was effected with an 8 S.W.G. type E. 217 electrode using D.C. 100 volts open circuit and a welding current of 140 amps., and commercial iron powder which had been applied in the internal corner was effective in providing a backing so that a uniform weld with an even small break-through of the welding metal and no burning of the plates resulted.

In the three examples hereinbefore described, it will be appreciated that as welding is effected along the edges to be joined, each magnet has to be removed in turn as the electrode approaches it, and replaced in its former position as the electrode moves away. In the first two examples, it is necessary to remove a magnet about 1/2" ahead of the electrode to avoid arc-blow. In the third example, the distance is about 2". The magnets adjacent to each removed magnet are quite sufficient to retain the magnetic powder in position opposite the welding electrode as it is moved along the weld line.

FIGURE 7 shows the application of the invention to corner-wise welding of plates to form a box-section, the interior of which is insufficiently large to permit of access for interior welding. Opposite plates 19, 21 of the box-section formed by four plates 19, 20, 21 and 22 respectively have their two longitudinal edges bevelled with retention of a small square-ended root edge. One or more magnets 23 and magnetic powder are employed in turn to form a powder backing 24 for the respective weld. In FIGURE 7, two completed welds are shown.

In general, the strength of the magnetic field and/or the spacing of multiple magnets may be generally proportioned to the thickness of the plates or other parts to be joined. Although the tendency is for the powder bridge to locate itself solely beyond the rear face, some powder may find its way into the welding groove formed by preliminary shaping of the edges of thicker or very thick parts, but this can be readily smoothed away, to leave the bottom of the groove clear to receive the first run.

In the case of gas-welding thin sheets, the magnetic powder follows any buckling or other movement of the sheets during the operation, and provides such a support that burning through is practically impossible. Sufficient of the powder may, moreover, become incorporated in the weld as to make unnecessary the use of a separate wire to provide filler metal.

Although permanent magnets have been described in the applications and examples herein set forth, they can be substituted by electromagnets if desired.

It is intended that where reference has been made herein, including in the claims, to the edges of two parts, this is to include the two edges of a single part where the context so admits. Thus the invention is equally applicable to the joining by welding of two edges of a single part which is bent so that the edges can adjoin one another, for example the formation of a tube from a single curved piece of material by butt-welding the edges.

I claim:

1. A method of welding ferro-magnetic parts, comprising the steps of securing adjoining edges of the parts in correct position for receiving a fusion-deposit of weld metal, applying a magnetic field between said edges, applying to the rear of the parts a powder which is ferromagnetic as to at least 50% of its composition, for bridging said edges along their rear sides, and effecting welding from the front of the parts, the bridge of powder being maintained essentially only by said magnetic field and serving for providing a support at the rear of the parts for the molten weld metal.

2. A method according to claim 1, wherein said magnetic field is applied between said edges by at least one magnet bridging said parts.

3. A method according to claim 1, wherein said powder contains a flux in powder form.

4. A method of welding ferro-magnetic parts, comprising the steps of securing adjoining edges of the parts in correct position for receiving a fusion-deposit of weld metal, applying a magnetic field between said edges, applying to the rear of the parts a powder which is ferro-magnetic as to at least 50% of its composition, for bridging said edges along their rear sides, effecting welding from the front side of the parts, the bridge of powder being maintained essentially only by said magnetic field and serving for providing a support at the rear of the parts for the molten weld metal, and then removing said powder from said parts by removal of said magnetic field and by demagnetising said parts by heating them.

5. A method of welding ferro-magnetic parts, comprising the steps of securing adjoining edges of the parts in correct position for receiving a fusion-deposit of weld metal, applying a magnetic field between said edges, applying to the rear of the parts a refractory magnetic powder for bridging said edges along their rear sides, and effecting welding from the front of the parts, the bridge of refractory powder being maintained essentially only by said magnetic field and serving for providing a support at the rear of the parts for the molten weld metal and, by virtue of its refractory character, resisting being incorporated in the weld.

6. A method of welding ferro-magnetic parts comprising placing the parts with edges thereof in correct relation to receive a fusion-deposit of weld metal at the front of the parts, magnetizing the parts to establish a magnetic field across the edges thereof, applying the edges of the parts at the back thereof a powder which is ferro-magnetic to at least 50% of its composition and is magnetized by said magnetic field to form a supporting bridge between the edges of the parts for molten weld metal, said bridge being maintained essentially only by said magnetic field, and fusion-welding the edges of the parts from the front thereof while the bridge provides a support for the molten weld metal at the back of the parts.

7. A method of welding ferro-magnetic parts comprising holding the parts with adjoining edges thereof in correct relation to receive a fusion-deposit of weld metal at the front of the parts, magnetizing the parts to produce a magnetic field across the edges thereof, applying to the edges of the parts at the back thereof a powder having a ferro-magnetic content of at least 50% of its composition and which is magnetized by the magnetic field to form a bridge between said edges of sufficient rigidity to provide a support for molten weld metal, said bridge being maintained essentially only by said magnetic field, depositing molten weld metal between the edges of the parts from the front thereof to form a weld between them, and de-magnetizing the parts to interrupt the magnetic field and removing said powder from the parts after the welding.

References Cited in the file of this patent

UNITED STATES PATENTS

| 2,064,773 | Vogt | Dec. 15, 1936 |
| 2,331,689 | Hodge | Oct. 12, 1943 |
| 2,346,555 | Cobb | Apr. 11, 1944 |
| 2,395,723 | Chmielewski | Feb. 26, 1946 |
| 2,441,176 | Wilson et al. | May 11, 1948 |
| 2,584,072 | White | Jan. 29, 1952 |

FOREIGN PATENTS

| 571,937 | Great Britain | Sept. 14, 1945 |